(12) United States Patent
Dicken

(10) Patent No.: US 7,576,740 B2
(45) Date of Patent: Aug. 18, 2009

(54) METHOD OF VOLUME VISUALIZATION

(75) Inventor: Volker Dicken, Bremen (DE)

(73) Assignee: Fraunhofer-Institut für Bildgestützte Medizin Mevis, Bremen (DE)

( * ) Notice: Subject to any disclaimer, the term of this patent is extended or adjusted under 35 U.S.C. 154(b) by 161 days.

(21) Appl. No.: 10/781,354

(22) Filed: Feb. 17, 2004

(65) Prior Publication Data

US 2004/0227756 A1    Nov. 18, 2004

(30) Foreign Application Priority Data

Mar. 6, 2003    (EP)    ................... 03005046

(51) Int. Cl.
*G06T 17/00* (2006.01)
*G06K 9/00* (2006.01)

(52) U.S. Cl. ...................... 345/424; 382/131
(58) Field of Classification Search ................ 345/424
See application file for complete search history.

(56) References Cited

U.S. PATENT DOCUMENTS

| | | | |
|---|---|---|---|
| 5,530,455 A * | 6/1996 | Gillick et al. ............... | 345/163 |
| 6,083,162 A * | 7/2000 | Vining ........................ | 600/407 |
| 6,310,620 B1 * | 10/2001 | Lauer et al. ................. | 345/424 |
| 2002/0028006 A1 * | 3/2002 | Novak et al. ................ | 382/128 |
| 2003/0099389 A1 * | 5/2003 | Zeng et al. .................. | 382/131 |
| 2005/0228250 A1 * | 10/2005 | Bitter et al. ................. | 600/407 |

OTHER PUBLICATIONS

Wan, M. Tang, Q. Kaufman, A. Liang, Z. Wax, M., "Volume rendering based interactive navigation within the humancolon", Visualization '99. Proceedings, Pub: 1999.*

D. Gering- A System for Surgical Planning and Guidance using Image Fusion and Interventional MR, Thesis, Dept. of Electrical Engineering and Computer Science at MIT, 1999, pp. 1-106.*

Hanspeter Pfister, Arie Kaufman, Tzi-Cker Chiueh, Cube-3: a real-time architecture for high-resolution volume visualization, Proceedings of the 1994 symposium on Volume visualization, p. 75-82, Oct. 17-18, 1994, Tysons Corner, Virginia, United States.*

M.M. Madi et al, "Modeling and visualization of layered objects", Computers & Graphics 23 (1999) pp. 331-342.

N.M. Sirakov et al, "A system for reconstructing and visualising three-dimensional objects", Computers & Geosciences 27 (2001) pp. 59-69.

David E. Breen et al, "Generating Shaded Offset Surfaces with Distance, Closest-Point and Color Volumes", Computer Graphics Group, XP-002250404, pp. 1-14.

Bradley A. Payne et al, "Distance Field Manipulation of Surface Models", IEEE Computer Graphics and Applications 12 (1992), January, No. 1, Los Alamitos, CA., pp. 65-71.

Suya You et al, "Interactive Volume Rendering for Virtual Colonoscopy", IEEE 1997 pp. 433-436.

European Search Report for 03005046.2, (2003).

* cited by examiner

*Primary Examiner*—Xiao M Wu
*Assistant Examiner*—Daniel F Hajnik
(74) *Attorney, Agent, or Firm*—Fleit Gibbons Gutman Bongini & Bianco PL; Martin Fliet; Paul D. Bianco

(57) ABSTRACT

The present invention relates to a method of volume visualization in which volumetric data is provided, the volumetric data having first voxels belonging to a reference surface. Second voxels of the volumetric data are determined having a user selected distance from the reference surface. The second voxels are visualized.

12 Claims, 3 Drawing Sheets

METHOD OF VOLUME VISUALIZATION

BACKGROUND OF THE INVENTION

1. Field of the Invention

The present invention relates to the field of volume visualisation, and more particularly without limitation to volume rendering.

2. Prior Art

Volumetric data is typically a set S of samples (x, y, z, v), representing the value v of some property of the data, at a 3D location (x, y, z). If the value v is simply a 0 or a 1, e.g. with a value of 0 indicating background and a value of 1 indicating the object, then the data is referred to as binary data. The data may instead be multivalued, with the value representing some measurable property of the data, including, for example, colour, density, heat or pressure.

In general, samples may be taken at purely random locations in space, but in most cases the set S is structured, containing samples taken at regularly spaced intervals along three orthogonal axes. When spacing between samples along each axis is a constant, the set S is isotropic. If there are different spacing constants for the three axes, the set S is anisotropic. Since the set of samples is defined on a regular grid, a 3D array (called also volume buffer, cubic frame buffer, 3D raster) is typically used to store the values, with the element location indicating position of the sample on the grid. Alternatively, rectilinear, curvilinear (structured), or unstructured grids are employed. In a rectilinear grid the cells are axis-aligned, yet grid spacings along the axes might be arbitrary.

Volume visualisation is a method of extracting meaningful information from volumetric data. Volume data are obtained by sampling, simulation, or modelling techniques. For example, a sequence of 2D slices obtained from magnetic resonance imaging (MRI) or computed tomography (CT) is 3D reconstructed into a volume model and visualised for diagnostic purposes or for planning of treatment or surgery. In many computational fields, as in fluid dynamics, the results of simulations typically running on a supercomputer are often visualised as volume data for analysis and verification. In addition, many traditional geometric computer graphics applications, such as CAD and simulation, as well as applications mixing geometric objects with medical data have exploited the advantages of volume techniques for visualisation.

Volume rendering is the process of creating a 2D image directly from 3D volumetric data. Volume rendering can be achieved using an object-order, an image-order, or a domain-based technique. Object-order volume rendering techniques use a forward mapping scheme where the volume data is mapped onto the image plane. In image-order algorithms, a backward mapping scheme is used where rays are cast from each pixel in the image plane through the volume data to determine the final pixel value. In a domain-based technique, spatial volume data is first transformed into an alternative domain, such as compression, frequency, and wavelet, and then a projection is generated directly from that domain.

For an overview of various prior art volume rendering techniques reference is made to 'Handbook of medical imaging, processing and analysis', Isaac N. Bankman, Academic press 2000.

An important field of application of volume visualisation techniques is medical imaging, such as imaging of MRI or CT image data.

For example, the number of slices acquired in thorax CT scans is strongly increasing with advances in scanner technology. Current clinical scanners may produce more than 400 slices at resolution 512×512. Lab versions of scanners produce up to 2000 slices of size 1024×1024. The conventional way of looking at single axial slices for diagnostic purposes is very tedious, time consuming and error prone. Volume rendering techniques (VRT) are therefore increasingly popular in reading multi-slice thorax scans.

Therefore a need exists for providing an improved method of volume visualization.

Payne B. A. et al: "Distance Field Manipulation of Surface Models" IEEE Computer Graphics and Applications, IEEE Inc. New York, US, vol. 12, no. 1, 1992, pages 65-71, XP000282008, ISSN:0272-1716 shows a surface manipulation technique that uses distance fields, i.e. scalar fields derived geometrically from surface models, to combine, modify and analyze surfaces.

Suya You et al: "Interactive volume rendering for virtual colonoscopy" IEEE Conference on Visualization, Los Alamitos, Calif.: IEEE Computer Soc, US, vol. Conf. 8, 19 October 1997 (1997-10-19), pages 433-436, 571, XP010270139, ISBN: 0-8186-8262-0 shows the system for interactive virtual colonoscopy. The system enables a user to interactively navigate inside a virtual colon world in a manner similar to optical colonoscopy.

A common disadvantage of such prior art system is that the interactive navigation mode that is provided is not intuitive and difficult to use.

SUMMARY OF THE INVENTION

The present invention provides a method of volume visualisation which enables to visualise an image region having a defined distance from a reference surface comprised in the image data.

An important field of application of the present invention is medical imaging. For example an organ surface of a patient can be used as the reference surface. A user can interactively specify a desired distance from the reference surface. In response the voxels of the volumetric data having the specified distance from the reference surface are selected and visualised. This enables a radiologist to view surfaces in the volumetric data related to a selected reference surface.

One of the advantages of using an organ surface or another anatomic or pathologic feature of the patient as a reference surface is that the patients anatomy itself provides the coordinate system for defining the image region to be rendered. For example anatomic features which are related to the surface of the organ can be visualised in an intuitive way.

This is particularly advantageous for thorax imaging in order to identify suspicious regions. In thorax CT data the radiologist frequently has to identify dense nodules in the lungs parenchyma. These nodules, which are small regions suspicious for malignant tumors, are of particular importance. In the simplest case the nodules have isolated locations, but they occur frequently adjacent to the pleura or mediastinum, were they may also appear like a swelling of the surrounding tissue in the form of a lenticular or roundish plating of e.g. the pleura. The demarcation of tumor and healthy tissue is therefore based on very different contrasts in the diverse lung regions.

With prior art rendering techniques such as thin-slab MIP (Napel S, Rubin G D, Jeffrey R B Jr., STS-MIP: a new reconstruction technique for CT of the chest. J. Comput. Assist. Tomogr. 17(5):832-8 September-October 1993; Eibel R, Turk T R, Kulinna C, et al.: Multidetector-row CT of the lungs: Multiplanar reconstructions and maximum intensity projections for the detection of pulmonary nodules. Rofo. Fortschr. Geb. Rontgenstr. Neuen Bildgeb. Verfahr. 173(9): 815-21, September 2001.) even large tumors in the hilus region may be overlooked between the main lung vessels or their boundary may not be well defined. Even with the recently introduced techniques diagnosing of medical images using prior art rendering techniques takes a lot of time and is tedious. Reading thorax data in the conventional way by going through the individual slices or with thin-slab MIP in addition has the implied risk of overlooking suspicious regions.

In contrast, the present invention enables to visualise these images in an intuitive and easy to interpret way. This is due to the fact that the patient's anatomy is used as a reference for defining the image region to be visualised. Further the anatomy tends to be almost homogeneous near prominent inner surfaces in the body. Thus the invention enables to produce images which show almost homogenous naturally curved layers of the body, wherein a pathology is easily noticed.

It is to be noted that the present invention is not restricted to the particular type of thorax CT image data, but can be used in various different fields, such as visualisation of volumetric data provided by e.g. MRI, CT or 3D ultrasound scans of various body parts in medicine or outside the medical field to data from 3D microscopy, 3D geologic data, weather data, fluid dynamics simulations etc.

In accordance with a preferred embodiment of the invention, an image segmentation is performed on the original volumetric data. By means of the segmentation, a certain object is identified in the volumetric data. An envelope of the object is then used as a reference surface.

Segmentation methods are as such known from the prior art. In particular, segmentation is an important tool in medical image processing. By means of segmentation an image is partitioned into regions that are homogeneous with respect to one or more characteristics or features. Known segmentation techniques include pixel-based local methods, region-based global methods, low-level segmentation (threshholding, region growing, watershed transform, etc), model-based segmentation (multispectral or feature map techniques), dynamic programming, contour flowing etc., statistical, fuzzy and neural network techniques to name a few. For an overview of prior art medical image segmentation methods reference is made to 'Handbook of medical imaging, processing and analysis', Isaac N Bankman, Academic Press 2000, in particular chapter II. 5.

For example, an organ can be segmented from the volumetric data. This segmentation provides an indication of which ones of the voxels contained in the volumetric data belong to the organ and which ones do not. By taking only those voxels of the organ that have neighbouring voxels not belonging to the organ the organ surface can be defined.

The organ surface is used as a reference surface for selecting voxels of the volumetric data being equidistant to that reference surface. This way an inner layer of the organ being parallel to the organ surface or an outer layer surrounding the organ in parallel to the organ surface can be visualised. This is especially useful for identification of suspicious regions, such as tumours near the surface, or for an example employing an outer layer, to provide a view of all ribs surrounding the lung in one image for the task of diagnosing rib fractures.

Various distance measures can be used for selecting the voxels which are equidistant from the reference surface. For example the distance of a given voxel from the reference surface can be measured along the grid of the 3D image array. Alternatively the Euclidian shortest distance of the voxel from the reference surface can be calculated as a distance measure.

For computation of the Euclidean distances, the multidimensional distance transform algorithm for digitised images which is as such known from T Saito and J.-I Toriwaki, "New algorithms for Euclidean distance transformation of an n-dimensional digitised picture with applications," Pattern Recognition 27, pp. 1551-1565, 1994 can be utilised.

Alternatively the distance can be measured along the projection ray of perspective projection or a more general distance measure, e.g. such as by means of a potential field calculus.

The resulting set of equidistant voxels can be visualised by means of any suitable visualisation method, such as by orthogonal projection, perspective projection, and/or volume rendering techniques.

The computer system of the invention is provided with a user interface for interactive selection of desired distance. The user interface has a wheel mouse. By rotating the wheel of the wheel mouse the user can enter the desired distance from the reference surface in order to define voxel x of the volumetric data whose data values are to be visualized. This way a user is enabled to interactively navigate through a given body region by using the surface of an organ as a reference for the navigation in an intuitive, ergonomic an cheap to implement way.

This is especially useful for diagnostic purposes and operation planning. Likewise such a computer system can also be used for interactive visualisation of other three or more dimensional data, such as 3D microscopy data, weather data, geologic data, or data describing a biological technical, physical or chemical process.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS OF THE INVENTION

Figure 1:
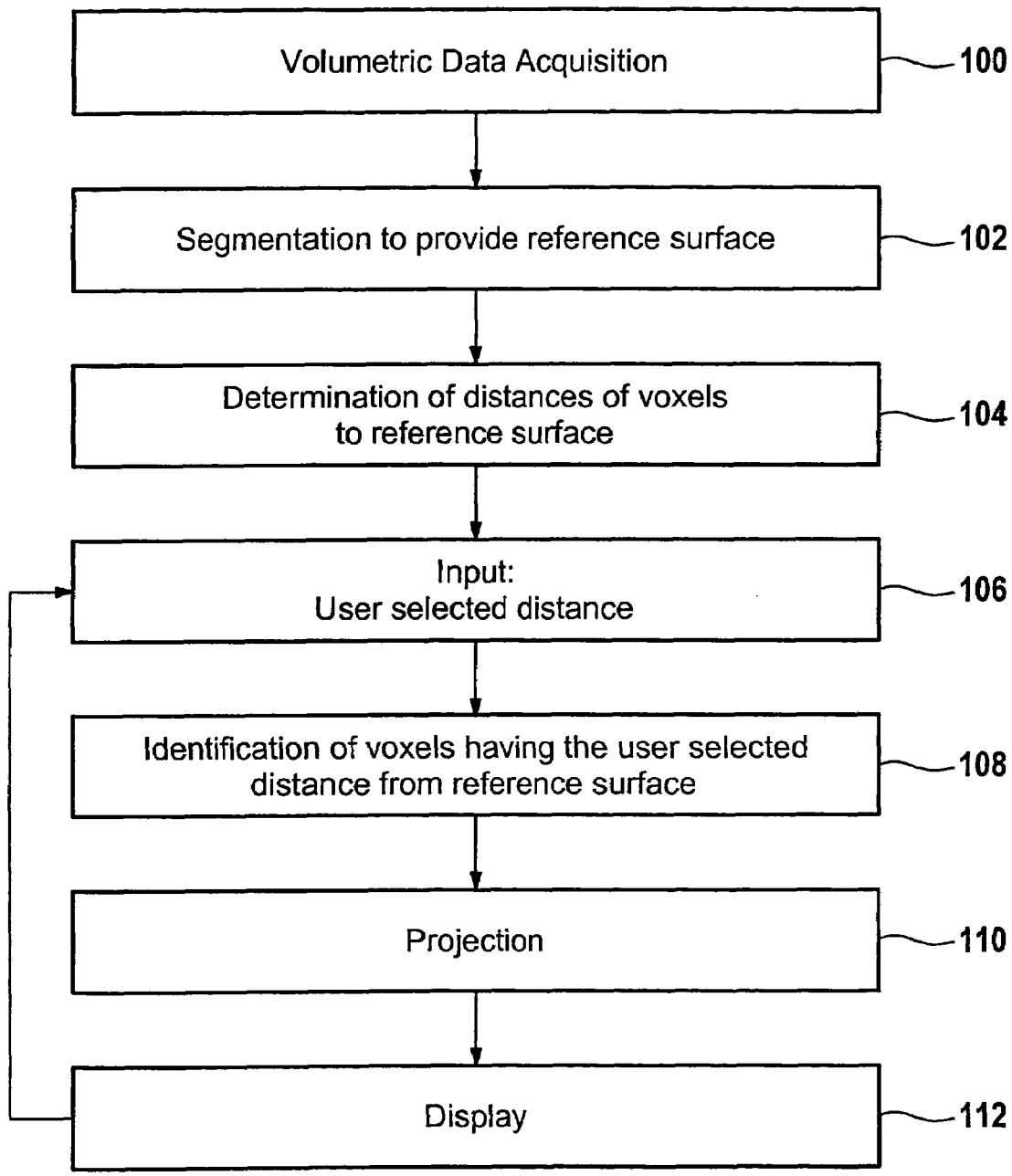
FIG. 1 is illustrative of a flow chart for the visualisation of volumetric data.

FIG. 1 shows a flow chart of a method for visualising of volumetric data. In step 100 a volumetric data acquisition is performed. For example, in the case of medical data this can be done by means of CT or MR data acquisition. Alternatively 3D microscopy or any other image data source can be used. In general, any three or more dimensional data can be used as an input data set for the visualisation.

In step 102 the segmentation of the volumetric data is performed. The segmentation can have the purpose of segmenting a particular anatomic region, such as an organ. Any known segmentation method can be used for this purpose.

For example the result of the segmentation is provided as a binary mask which identifies those voxels of the volumetric data belonging to the segmented structure, object or organ. The binary mask defines the envelope of the segmented structure. The surface of the segmented structure can be identified from the binary mask by any suitable prior art method, such as a morphological gradient method.

Alternatively the segmentation performed in step 102 can directly provide the reference surface rather than a segmented volume.

In step 104 the distances of the voxels of the volumetric data which are outside the reference surface to the reference surface are determined. For determination of the distances various distance measures can be used. For example, if orthogonal projection along one of the grid axis of the volumetric data set is used the distance of a voxel to the reference surface can be defined as the distance between the voxel and the reference surface along the projection ray going through that voxel.

Alternatively a minimum distance of the voxel from the reference surface can be determined. In this case the Euclidian distance measure is a good choice. The result of the distance determination performed in step 104 can be provided as a distance map having the same dimension as the volumetric data set and having a distance measure for each one of the voxels of the volumetric data, except for the voxels on the reference surface, where the distance is 0 by definition.

In step 106 a user enters a desired distance. For example the distance can be specified as a number of voxels or in length units, such as millimeters.

In step 108 the distance map provided in step 104 is searched for identification of voxels having the user selected distance from the reference surface. The result of this identification step can be provided by a binary mask having the same dimension as the volumetric data set and which indicates for each one of the voxels of the volumetric data set whether it is at the selected distance from the reference surface or not.

Alternatively the selection of voxels at the specified distance can be implicit in a reformatting of the data prior to a projection, or the selection may be integrated in the rules determining the opaqueness of voxels in a volume rendering software.

The distance mask can be used as a basis for performing a projection of the equidistant voxels in step 110. For example, an orthogonal, perspective or other kind of projection is performed or another volume rendering technique is applied on the voxels identified by the distance mask in order to generate a display in step 112. From there the control can go back to step 106. In step 106 the user can enter another distance in order to navigate through the volumetric data using the segmented surface as a reference.

Figure 2:
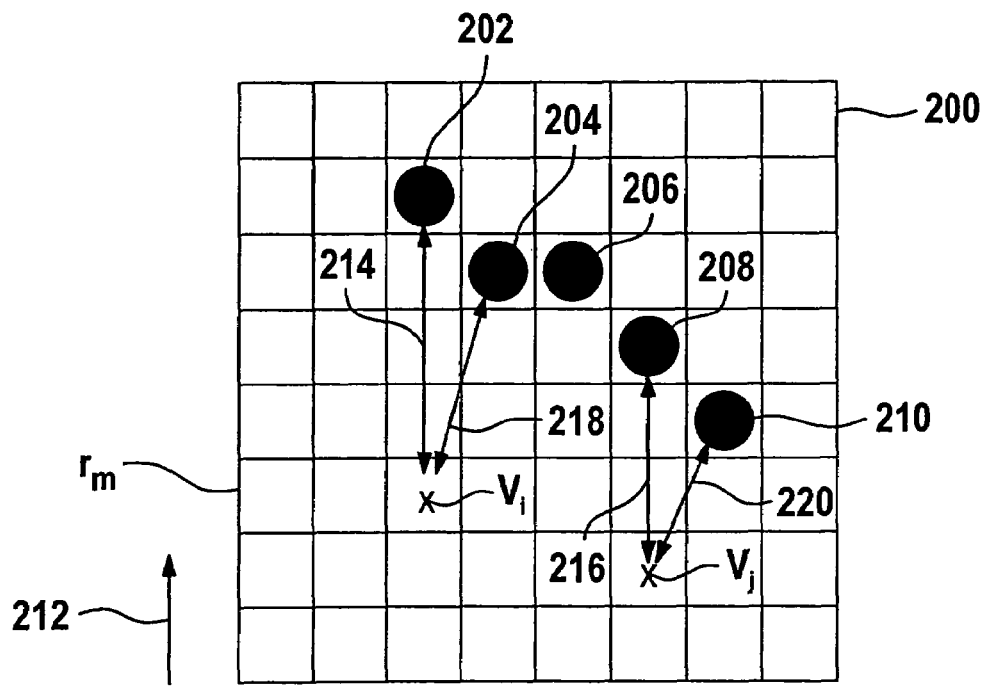
FIG. 2 is a simplified schematic showing a two dimensional slice of the volumetric data comprising a reference surface.

FIG. 2 is illustrative of a schematic example. FIG. 2 shows a two dimensional slice 200 of a volumetric data set. Within slice 200 there are voxels 202, 204, 206, 208, 210, . . . which belong to an image region which has been segmented from the volumetric data. For example the image region is an organ. These voxels 202 to 210 define the reference surface for the volume visualisation.

As a pre-processing step before the volume visualisation the distances of all voxels $V_i$, $V_j$ outside the segmented reference surface to the reference surface are determined.

For example, if an orthogonal projection along the grid of the volumetric data set is used, such as in direction 212 the distance between voxel $V_i$ and the reference surface can be measured along the corresponding projection ray of the orthogonal projection. In the example shown in FIG. 2 this is the distance 214 between the voxel $V_i$ and voxel 202 of the reference surface.

For voxel $V_j$ this is the distance 216 to voxel 208 of the reference surface and so on. Preferably the distances 214, 216, . . . are determined for all voxels $V_i$, $V_j$, . . . which do not belong to the reference surface defined by voxels 202, 204, 206, 208, 210, . . .

As an alternative distance measure minimal distances of the voxels $V_i$, $V_j$, . . . from the reference surface are determined. For example distance 218 is the minimum Euclidian distance of voxel $V_i$ to the reference surface, i.e. voxel 204. Likewise distance 220 is the minimum Euclidian distance of voxel $V_j$ from the reference surface, i.e. voxel 210. Again it is preferred to determine all the distances 218, 220, . . . for all voxels outside the reference surface as a pre-processing for the volume visualisation.

Next a user can select a desired distance and those voxels of the volumetric data set which have a distance from the reference surface corresponding to the user selected distance are shown in the visualisation.

Figure 3:
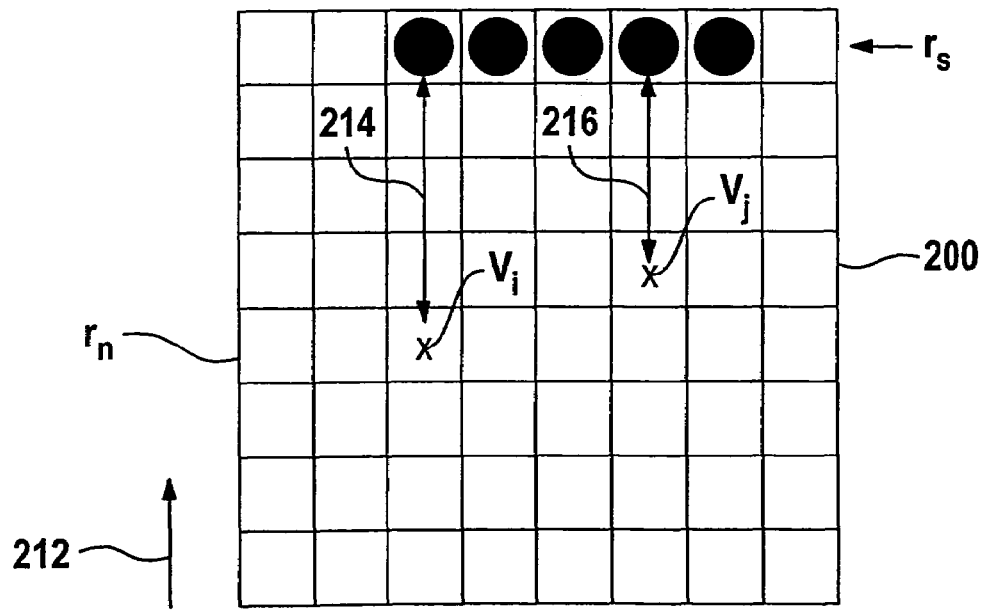
FIG. 3 shows the example of FIG. 2 after an orthogonal projection.

Alternatively a reformatting step is performed on the volumetric data as a further pre-processing step. The principle of the reformatting operation is illustrated in FIG. 3. All voxels 202 to 210 of the reference surface are moved to common row $r_s$ of slice 200. The voxels which are outside the reference surface are also moved within slice 200 such that the respective distances from the reference surface remain the same. In other words a voxel $V_i$ is moved to row $r_n$ from its original row $r_m$ by a number of rows m-n such that its distance 214 (cf. FIG. 2) from the reference plane remains the same. The same principle applies for the other voxels outside the reference surface, namely voxel $V_j$.

As a result all voxels which are equidistant to the reference surface are moved into a common row.

On the basis of this reformatted volumetric data set it is possible to visualise slices containing curved layers of anatomy. For this purpose an image is generated for the voxels within a common row of slice 200 and the voxels in the same row positions in parallel slices. This way a radiologist can step through layers which are parallel to the reference surface which provides an intuitive view on anatomic information, especially for diagnostic purposes.

Figure 4:
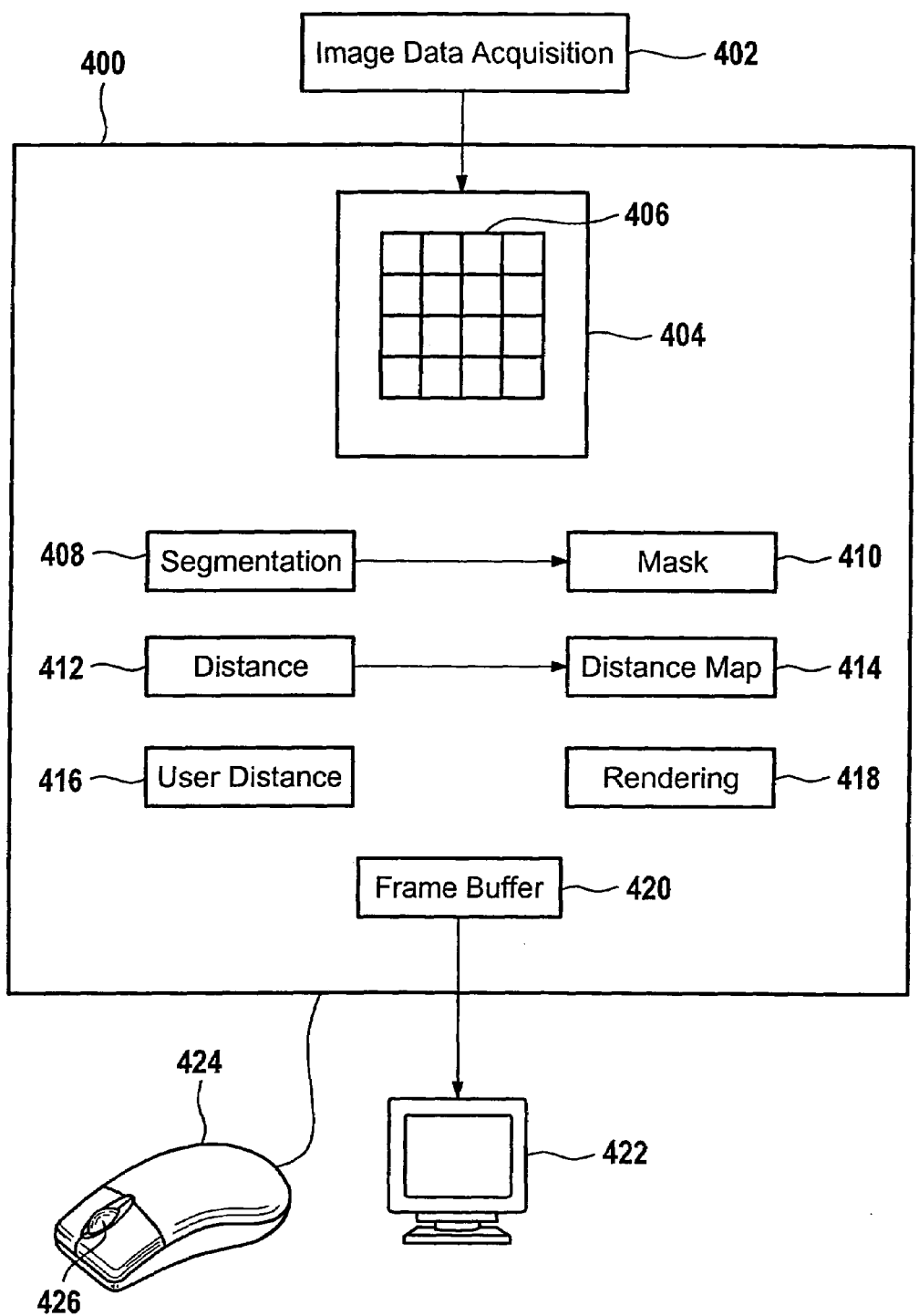
FIG. 4 shows a block diagram of a computer system.

FIG. 4 shows a computer system 400 which is coupled to an image data acquisition system 402. For example image data acquisition system 402 is a CT or MR apparatus providing medical volumetric data.

Computer system 400 has image storage 404 for storing of a volumetric data set 406 provided by image data acquisition system 402.

Further computer system 400 has segmentation program 408 stored on computer readable media. Segmentation program 408 serves to identify a region of interest within volumetric data set 406, such as an organ or another anatomic region. Segmentation program 408 provides binary mask 410 having the same dimension as volumetric data set 406. A value of 0 in the mask 410 indicates that the corresponding voxel in volumetric data set 406 does not belong to the region of interest whereas a value of 1 indicates that the corresponding voxel belongs to the region of interest. As a consequence mask 410 also describes the envelope of the segmented region of interest. The envelope is used as a reference surface for identification of equidistant voxels in the volumetric data set 406.

Alternatively segmentation program 408 directly extracts the reference surface from the volumetric data set rather then segmenting an organ as an intermediate processing step.

Further computer system 400 has program 412 for providing a distance map 414. Distance map 414 has the same dimension as volumetric data set 406. Each value in distance map 414 indicates the distance of the corresponding voxel of volumetric data set 406 to the reference surface which is identified by mask 410. For example program 412 calculates the shortest distance of each voxel of volumetric data set 406 to the reference surface. The distances can be calculated as Euclidian distances or by means of a general mathematical distance measure, such as a potential field distance calculus.

When a user has selected a desired view a transparency value is calculated for each voxel depending on the distance of that voxel which is stored in the distance map 414.

Further computer system 400 has user interface 416. By means of user interface 416 a user can interactively navigate through layers that are parallel to the reference surface. Wheel mouse 424 is coupled to user interface 416 by rotating of wheel 426 of wheel mouse 424 a desired distance of the layer to be visualized from the referenced surface can be entered by the user. For example, a radiologist can select the distance of the layer to be visualized from the referenced surface by the amount of rotation of the wheel 426 of wheel mouse 424. Alternatively or in addition a graphical user interface with a virtual slider is provided; in this instance the radiologist can select the distance by moving the slider in a corresponding position.

Volume rendering program 418 serves to generate bit-mapped image data for frame buffer 420 for the visualisation of the voxels having the selected distance from the reference surface. These voxels are selected from the distance map 414 using the desired distance which has been entered by the user as a key. Alternatively the bit-map image is generated by modifying the transparency values which are assigned to the voxels depending on the selected distance from the reference plane.

A monitor 422 is coupled to frame buffer 420 for display of the bit-mapped image.

LIST OF REFERENCE NUMERALS

200 slice
202 voxel
204 voxel
206 voxel
208 voxel
210 voxel
212 direction
214 distance
216 distance
218 distance
220 distance
400 computer system
402 image data acquisition system
404 image storage
406 volumetric data set
408 segmentation program
410 Mask
412 Program
414 distance map
416 user interface
418 Rendering program
420 frame buffer
422 Monitor
424 wheel mouse
426 wheel

What is claimed is:

1. A method for revealing a suspicious region in an organ of a body, which comprises:
    scanning a preselected region of body tissue that contains an organ of interest to obtain a volumetric database including voxels of the preselected region;
    saving the volumetric database in memory as a saved volumetric database;
    subjecting the saved volumetric database to a segmentation technique to identify and distinguish an outer surface of the organ from surrounding tissue;
    using the outer surface of the organ as a reference surface;
    selecting a distance from said outer reference surface of the organ;
    extracting from said saved database voxels that are within the organ and that are located at the selected distance from the identified outer reference surface;
    extracting from said saved database voxels that are within the organ and that are located at the selected distance from the identified outer reference surface;
    after determining the distance from said reference surface for each voxel outside said reference surface, reformatting said voxels by shifting each of said voxels in said reference surface by a distance along a respective parallel line into a common plane while shifting each voxel in each of the lines by the distance that the given voxel in the reference surface in the given line was shifted;
    mapping the extracted voxels onto a two-dimensional grid; and
    displaying said two-dimensional grid onto a two-dimensional display to reveal any suspicious region in the organ at the selected predetermined distance from the reference surface.

2. The method of claim 1, wherein the distance of each of the voxels from the reference surface is determined by a minimum distance measure.

3. The method of claim 2, wherein the minimum distance measure is a Euclidean distance.

4. The method according to claim 1, wherein the volumetric data is medical image data.

5. The method according to claim 4, wherein said volumetric data is a thorax CT scan.

6. The method according to claim 1, wherein the reference surface is a surface of a lung.

7. The method according to claim 4, wherein the reference surface is a surface of a pathological structure.

8. The method of claim 1, wherein the volumetric data is three-dimensional microscopy data.

9. The method according to claim 1, wherein said respective parallel lines are orthogonal to said common plane.

10. The method according to claim 1, which further comprises determining the distance from said reference surface for each voxel outside said reference surface by calculating the distance of a given one of the voxels from a voxel in said reference surface along said respective parallel line.

11. The method according to claim 9, which further comprises determining the distance from said reference surface for each voxel outside said reference surface by calculating the distance of a given one of the voxels from a voxel in said reference surface along said respective orthogonal parallel line.

12. The method according to claim 1, which further comprises:
    selecting new sample voxels from said set of voxels, said sample voxels being a new distance from said reference surface, the new distance being different from the given distance;
    mapping said new sample voxels onto a two-dimensional grid; and
    displaying said two-dimensional grid on a two-dimensional display with said voxels with a property designating a suspicious region being distinguishable from said voxels with a property designating the organ.

* * * * *